(12) United States Patent
Ogawa

(10) Patent No.: US 11,313,365 B2
(45) Date of Patent: Apr. 26, 2022

(54) RECIPROCATING PUMP DESIGNED FOR PREVENTING VALVES FROM BEING ASSEMBLED ERRONEOUSLY

(71) Applicant: IWAKI CO., LTD., Tokyo (JP)

(72) Inventor: Yoshio Ogawa, Saitama (JP)

(73) Assignee: IWAKI CO., LTD., Tokyo (JP)

( * ) Notice: Subject to any disclaimer, the term of this patent is extended or adjusted under 35 U.S.C. 154(b) by 507 days.

(21) Appl. No.: 16/469,449

(22) PCT Filed: Dec. 15, 2016

(86) PCT No.: PCT/JP2016/087398
§ 371 (c)(1),
(2) Date: Jun. 13, 2019

(87) PCT Pub. No.: WO2018/109905
PCT Pub. Date: Jun. 21, 2018

(65) Prior Publication Data
US 2020/0109707 A1    Apr. 9, 2020

(51) Int. Cl.
*F04B 53/10* (2006.01)
*F16K 27/00* (2006.01)
(Continued)

(52) U.S. Cl.
CPC ...... *F04B 53/1002* (2013.01); *F04B 53/1005* (2013.01); *F16K 27/003* (2013.01);
(Continued)

(58) Field of Classification Search
CPC .. F04B 53/1002; F04B 53/1005; F04B 53/16; F04B 53/22; F04B 39/1006; F04B 39/14;
(Continued)

(56) References Cited

U.S. PATENT DOCUMENTS

| 4,272,225 A | * | 6/1981 | Fujinaka | F04B 43/04 417/417 |
| 4,507,062 A | * | 3/1985 | Wally | F04B 43/04 417/413.1 |

(Continued)

FOREIGN PATENT DOCUMENTS

| JP | S61-11473 A | 1/1986 |
| JP | S6111473 A | 1/1986 |

(Continued)

OTHER PUBLICATIONS

Supplemental European search report of 16923632.0.

*Primary Examiner* — Bryan M Lettman
(74) *Attorney, Agent, or Firm* — Taro Yaguchi

(57) ABSTRACT

At least one rib 9c, 21c extending in a direction of connecting with a valve cartridge 30 is provided to the inner sides of each of a second connection port 9 of a pump head 5 and a third connection port 21 of a first connecting adapter 20A, and at least one slit 41 which extends in the connecting direction and into which the ribs 9c, 21c are loosely inserted is provided to the lower outer periphery of the valve cartridge 30. The relationship (id2b, id3b)>od1t>(id1, id4)>od2>(id2t, id3t)>od1b is satisfied, where the inside diameter of a first connection port 8 is id1, the inside diameter of the second connection port 9 is id2b, the inscribed diameter at the top of the rib 9c of the second connection port 9 is id2t, the inside diameter of the third connection port 21 is id3b, the inscribed diameter at the top of the rib 21c of the third connection port 21 is id3t, the inside diameter of a fourth connection port 23 is id4, the outside diameter of the upper outer periphery of the valve cartridge 30 is od1t, the outside diameter of the bottom of the slit 41 at the lower outer periphery is od1b, and the outside diameter of the upper outer periphery of the valve cartridge 30 is od2.

8 Claims, 10 Drawing Sheets

(51) Int. Cl.
*F04B 53/16* (2006.01)
*F04B 53/22* (2006.01)
*F15B 13/00* (2006.01)
*F16K 1/14* (2006.01)
*F16K 1/36* (2006.01)

(52) U.S. Cl.
CPC ............... *F04B 53/16* (2013.01); *F04B 53/22* (2013.01); *F15B 2013/004* (2013.01); *F16K 1/14* (2013.01); *F16K 1/36* (2013.01)

(58) Field of Classification Search
CPC . F16K 27/003; F16K 1/14; F16K 1/36; F16K 15/04; F16K 15/042; F16K 2200/50; F16K 2200/501; F16K 2200/502; F15B 2013/004
USPC ...................................................... 137/533.15
See application file for complete search history.

(56) References Cited

U.S. PATENT DOCUMENTS

| | | | |
|---|---|---|---|
| 4,974,628 | A | 12/1990 | Tepermeister et al. |
| 6,354,819 | B1* | 3/2002 | Parikh ................... F04B 49/125 417/454 |
| 2013/0020416 | A1 | 1/2013 | Herre et al. |
| 2014/0119952 | A1* | 5/2014 | Adachi ................... F16K 15/04 417/53 |
| 2015/0158638 | A1* | 6/2015 | Maguire ................ F04B 15/02 137/511 |

FOREIGN PATENT DOCUMENTS

| | | |
|---|---|---|
| JP | 2012-525961 A | 10/2012 |
| JP | 2013-15133 A | 1/2013 |

* cited by examiner

An arrow view as seen from the direction of A

An arrow view as seen from the direction of B (a)

(b)

(c)

RECIPROCATING PUMP DESIGNED FOR PREVENTING VALVES FROM BEING ASSEMBLED ERRONEOUSLY

FIELD OF THE INVENTION

The present invention relates to a reciprocating pump that quantitatively transfers fluid, and particularly to the structure of a reciprocating pump designed for preventing valves from being assembled erroneously.

BACKGROUND OF THE INVENTION

There are a wide variety of well-known pump devices used for transferring fluid, including magnet pump devices, metering pump devices, and rotary displacement pump devices. The valve mechanism of such a pump device, for example, a ball valve used in a reciprocating pump as a metering pump device plays different roles on the seat surface (upper face) side of a valve seat, which performs check (nonreturn) by the free fall of a valve ball, and on the ceiling side of a valve guide, which secures the flow path even when the valve ball goes up.

Accordingly, valves cannot work if the direction of a ball valve is reversed when incorporated into a pump head; in other words the ball valve must be assembled in the correct mounting direction (assembling direction). Particularly, in the case of a two-staged ball valve in which valve balls, valve guides and valve seats are disposed at two (i.e., upper and lower) stages (see Patent Document No. 1 below), the significance of correct assembly further increases, because the management of correct mounting direction as well as mounting work tends to be more complicated.

PRIOR ART DOCUMENT

Patent Document

[Patent Document No. 1] Japanese Paten Publication No. S61-11473

SUMMARY OF THE INVENTION

Problem to be Solved by the Invention

However, in the reciprocating pump disclosed in the prior art (Patent Document No. 1), each of the two-staged ball valves of the suction side and discharge side could be assembled from the opposite side relative to the pump head. In this case, the flow path on the suction side and the flow path on the discharge side are reversed for transfer fluid, and therefore the problem due to the poor fluid transfer caused by erroneous assembly may occur or a decline in safety may occur when a pump is operated in condition where the erroneous assembly remains uncorrected.

The purpose of the present invention is to solve the above mentioned problems in the prior art by providing a reciprocating pump in which no erroneous assembly of valves could occur, because the assembly direction and sequence of the pump head can be uniquely determined.

Means for Solving the Problem

A first reciprocating pump of the present invention is a reciprocating pump, which introduces a transfer fluid to a pump chamber via a suction valve and discharges the transfer fluid from the pump chamber via a discharge valve by means of the reciprocating movement of a reciprocating movement member facing the pump chamber, the reciprocating pump comprising:

a pump head having the pump chamber, a first connection port provided on a transfer fluid suction side of the pump chamber, and a second connection port provided on a transfer fluid discharge side of the same, the first and second connection ports communicating with the pump chamber;

the suction valve comprising a valve cartridge, the valve cartridge containing a ball valve having a valve seat and a valve ball, wherein the valve ball is disposed above the valve seat and closes the valve seat by its own weight, an upper portion of the suction valve being housed in the first connection port;

the discharge valve comprising the valve cartridge, a lower portion of the discharge valve being housed in the second connection port;

a first connecting adapter, which is disposed on a lower side of the suction valve, has a third connection port housing the lower portion of the suction valve internally and connects the suction valve with the first connection port; and a second connecting adapter, which is disposed on an upper side of the discharge valve, has a fourth connection port housing an upper portion of the discharge valve internally and connects the discharge valve with the second connection port, wherein at least one rib extending in a connecting direction of the valve cartridge is provided on each of inner sides of the second connection port of the pump head and the third connection port of the first connecting adapter;

at a lower outer periphery of the valve cartridge, at least one slit which extends in the connecting direction and into which the rib is loosely inserted is provided, and relationship (id2b, id3b)>od1t>(id1, id4)>od2>(id2t, id3t)>od1b is satisfied, wherein an inside diameter of the first connection port is id1, an inside diameter of the second connection port is id2b, an inscribed diameter at a top of the rib of the second connection port is id2t, an inside diameter of the third connection port is id3b, an inscribed diameter at a top of the rib of the third connection port is id3t, an inside diameter of the fourth connection port is id4, an outside diameter of the lower outer periphery of the valve cartridge is od1t, an outside diameter of a bottom of the slit at the lower outer periphery is od1b, and an outside diameter of the upper outer periphery of the valve cartridge is od2.

A second reciprocating pump of the present invention is a reciprocating pump, which introduces a transfer fluid to a pump chamber via a suction valve and discharges the transfer fluid from the pump chamber via a discharge valve by means of the reciprocating movement of a reciprocating movement member facing the pump chamber, the reciprocating pump comprising:

a pump head having the pump chamber, a first connection port provided on a transfer fluid suction side of the pump chamber, and a second connection port provided on a transfer fluid discharge side of the same, the first and second connection ports communicating with the pump chamber;

the suction valve comprising a valve cartridge, the valve cartridge containing a ball valve having a valve seat and a valve ball, wherein the valve ball is disposed above the valve seat and closes the valve seat by its own weight, an upper portion of the suction valve being housed in the first connection port;

the discharge valve comprising the valve cartridge, a lower portion of the discharge valve being housed in the second connection port;

a first connecting adapter, which is disposed on a lower side of the suction valve, has a third connection port housing a lower portion of the suction valve internally and connects the suction valve with the first connection port; and a second connecting adapter, which is disposed on an upper side of the discharge valve, has a fourth connection port housing an upper portion of the discharge valve internally and connects the discharge valve with the second connection port, wherein at least one rib extending in a connecting direction of the valve cartridge is provided on each of inner sides of the first connection port of the pump head and the fourth connection port of the second connecting adapter;

at an upper outer periphery of the valve cartridge, at least one slit which extends in the connecting direction and into which the rib is loosely inserted is provided, and relationship (id1b, id4b)>od2t>(id2, id3)>od1>(id1t, id4t)>od2b is satisfied, wherein an inside diameter of the first connection port is id1b, an inscribed diameter at a top of the rib of the first connection port is id1t, the inside diameter of the second connection port is id2, an inside diameter of the third connection port is id3, an inside diameter of the fourth connection port is id4b, an inscribed diameter at a top of the rib of the fourth connection port is id4t, an outside diameter of the upper outer periphery of the valve cartridge is od2t, an outside diameter of a bottom of the slit at the upper outer periphery is od2b, and an outside diameter of the lower outer periphery of the valve cartridge is od1.

In one embodiment of the present invention, a plurality of the ribs and slits are provided at equal spatial intervals in the peripheral direction.

In another embodiment of the present invention, the valve cartridge has two-staged ball valves in which the ball valves are disposed at upper and lower two stages, and the slit is formed at the ball valve mounted on the inflow end side of the valve cartridge or the ball valve mounted on the outflow end side of the same.

In another embodiment of the present invention, the slit is formed in such a manner that an opening facing the connecting direction is widened.

Effect of the Invention

According to the present invention, an assembling direction and a sequence of valves to be mounted onto a pump head are uniquely determined, so that any possible erroneous assembly of the valves cannot occur, thereby any occurrence of wrong transfer can be prevented, and thereby enhancing safety.

DETAILED DESCRIPTION OF THE INVENTION

The following describes the reciprocating pump according to embodiments of the present invention in detail with reference to attached drawings. In the following embodiments, no invention described in each claim is intended to be limited. Nor is it that all the combinations of features described in embodiments are absolutely necessary as means of solving the problems.

Figure 1:
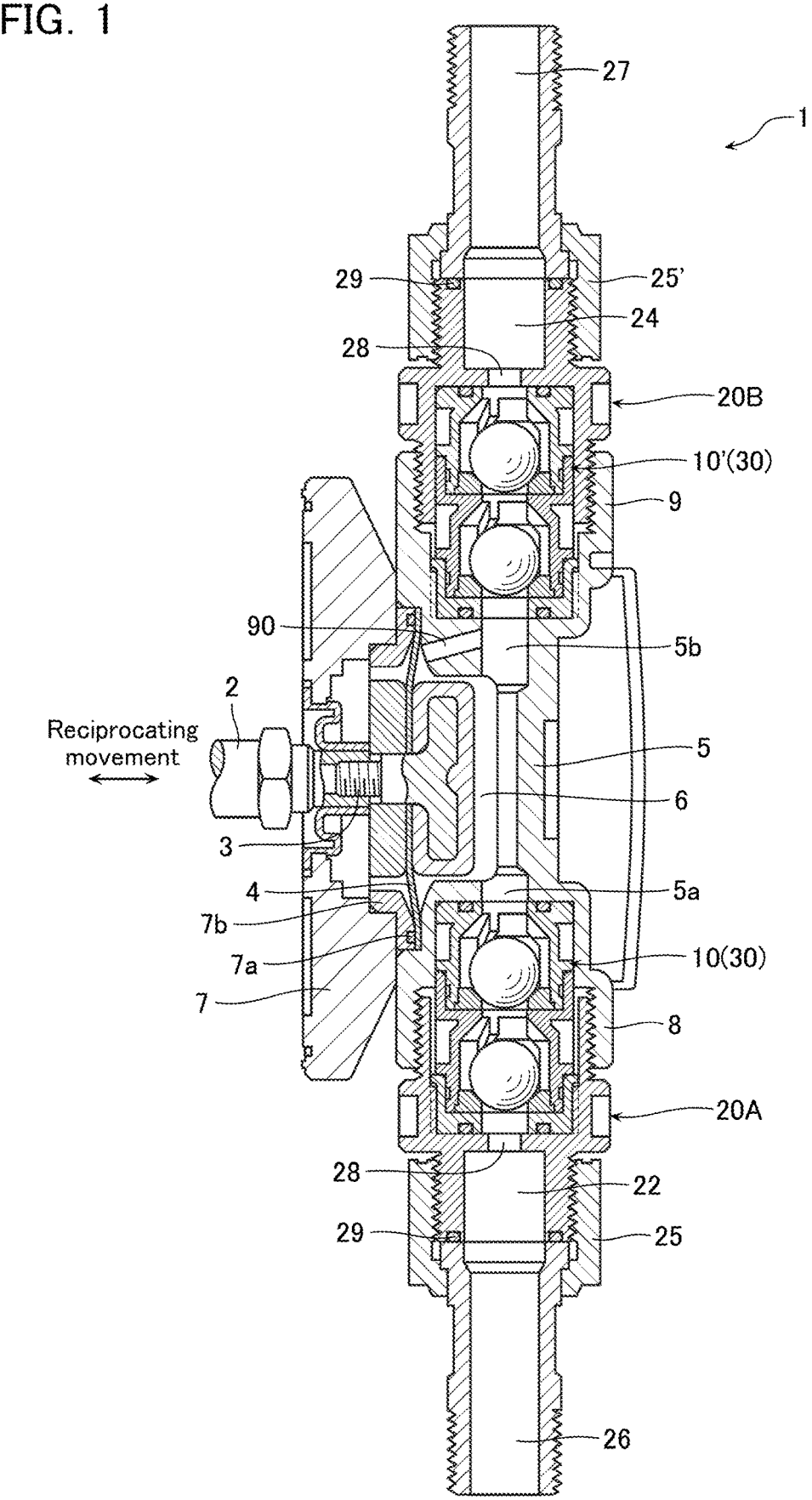
FIG. 1 is a sectional view showing the main part of a reciprocating pump according to a first embodiment of the present invention.
Figure 2:
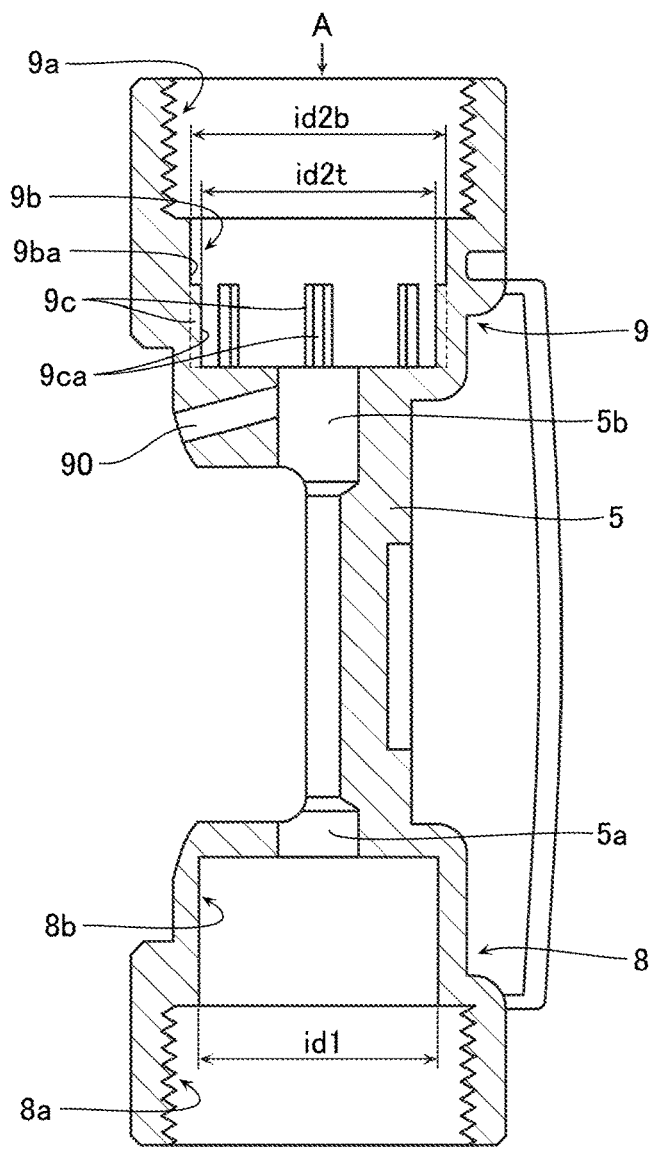
FIG. 2 is a sectional view showing the main part of the pump head of the same reciprocating pump.
Figure 3:
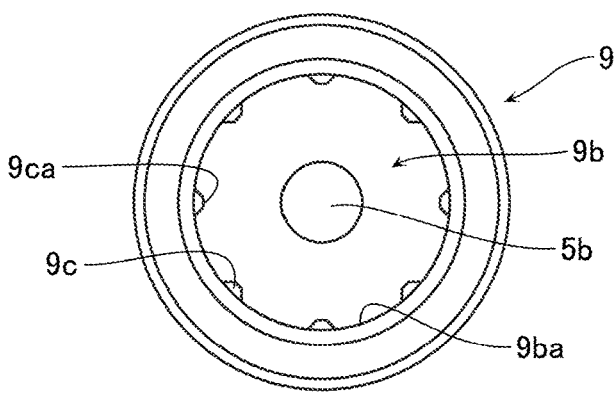
FIG. 3 is an arrow view as seen from the direction of A in FIG. 2.
Figure 4:
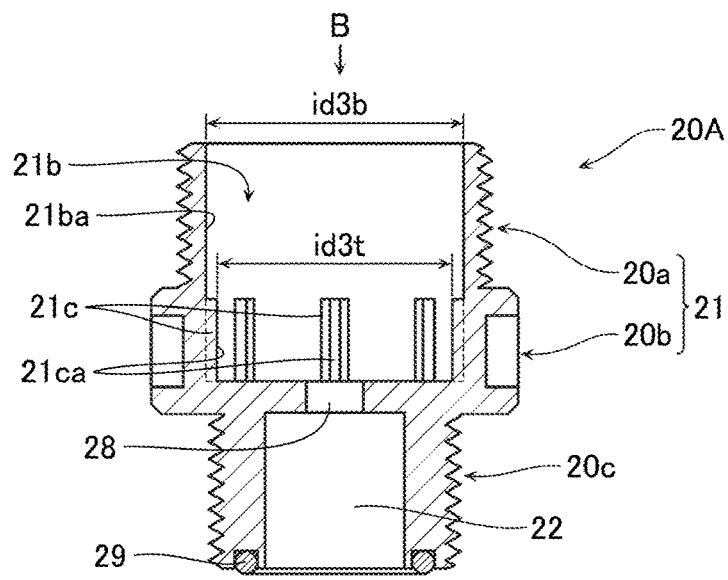
FIG. 4 is a sectional view showing a first connecting adapter of the same reciprocating pump.
Figure 5:
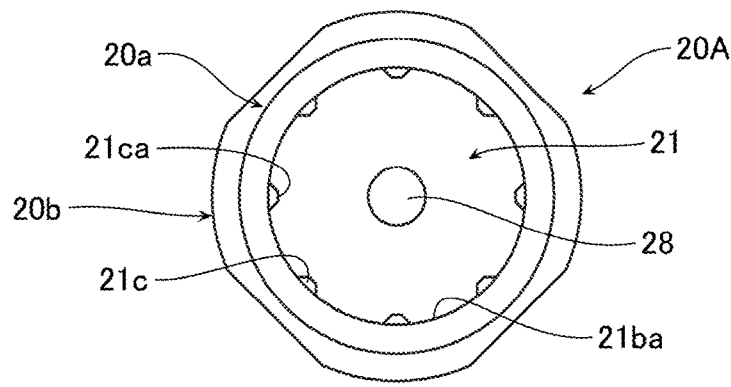
FIG. 5 is an arrow view as seen from the direction of B in FIG. 4.
Figure 6:
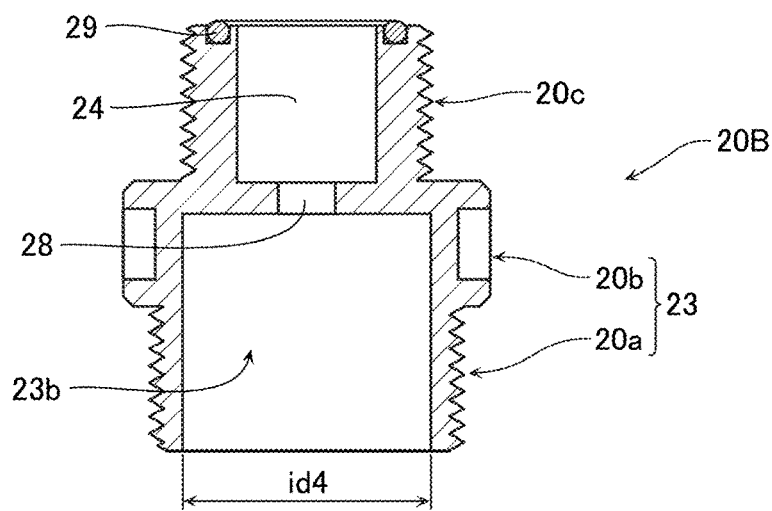
FIG. 6 is a sectional view showing a second connecting adapter of the same reciprocating pump.
Figure 7:
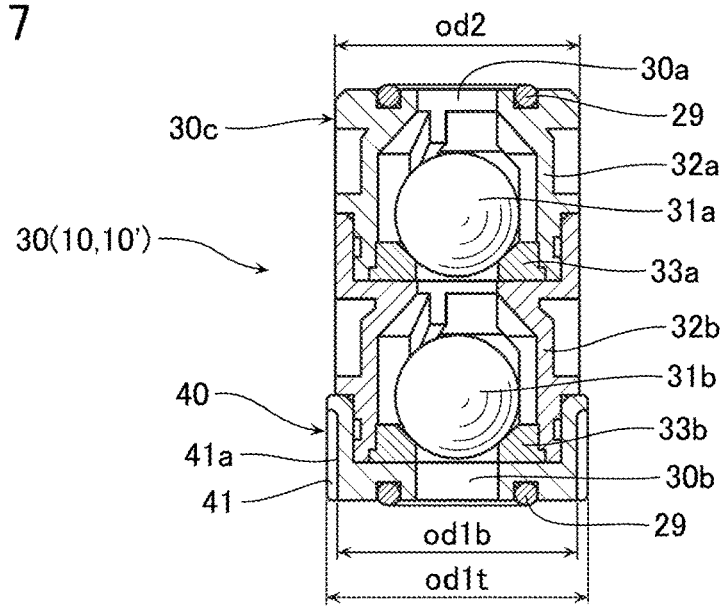
FIG. 7 is a sectional view showing a valve cartridge constituting suction and discharge valves of the same reciprocating pump.
Figure 8:
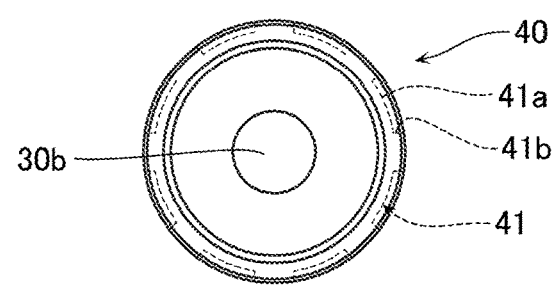
FIG. 8 shows the seat holder of the same valve cartridge.
Figure 8:
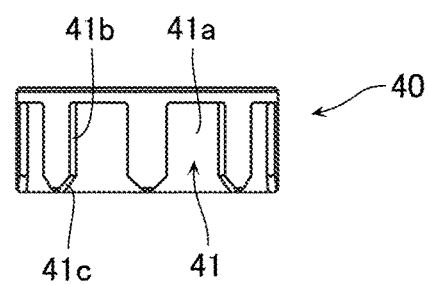
Figure 8:
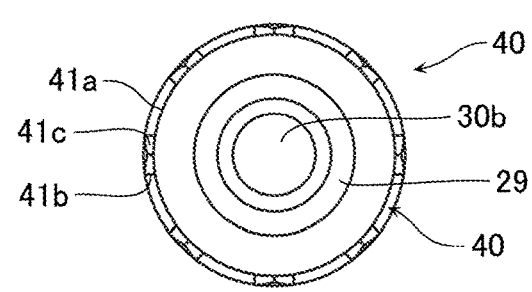

FIG. 1 is a sectional view showing the main part of a reciprocating pump according to a first embodiment of the present invention. FIG. 2 is a sectional view showing the main part of the pump head 5 of the same reciprocating pump. FIG. 3 is an arrow view as seen from the direction of A in FIG. 2. FIG. 4 is a sectional view showing a first connecting adapter 20A of the same reciprocating pump. FIG. 5 is an arrow view as seen from the direction of B in FIG. 4. FIG. 6 is a sectional view showing a second connecting adapter 20B of the same reciprocating pump. FIG. 7 is a sectional view showing a valve cartridge 30 constituting a suction valve 10 and a discharge valve 10' of the same reciprocating pump. FIG. 8 shows the seat holder 40 of the valve cartridge 30: FIG. 8(a) shows the upper face of the seat holder 40; FIG. 8(b) shows the side face of the seat holder 40; and FIG. 8(c) shows the lower face of the seat holder 40.

As shown in FIG. 1, a metering pump 1 according to one embodiment of the present invention has a rod-like driving axis 2, for example. The driving axis 2 is reciprocally driven in the direction shown with an arrow in the drawing by means of the motor driving force or electromagnetic force of a pump main body (not shown here). At the tip end of the driving axis 2, a flexible diaphragm 4 is mounted as a reciprocating member via an insert bolt 3.

A pump chamber 6 is formed in between the diaphragm 4 and a pump head 5. The diaphragm 4 is sandwiched in between the pump head 5 and a bracket 7 at its peripheral edges via a cushion material 7a and a spacer 7b, which assist the sealing of the diaphragm 4. At the pump head 5 are formed a suction port 5a, which communicates with a lower portion of the pump chamber 6, and a discharge port 5b, which communicates with an upper portion of the pump chamber 6. At the upper portion of the pump chamber 6 is provided a gas venting passage 90, which is connected with the discharge port 5b.

At the pump head 5 are formed a first connection port 8 on a transfer fluid suction side, which is disposed at a lower portion of a suction port 5a, and a second connection port 9 on a transfer fluid discharge side, which is disposed at an upper portion of the discharge port 5b. Each of those first and second connection ports 8, 9 of the pump head 5 is formed cylindrically and communicates with the pump chamber 6 via the suction port 5a and the discharge port 5b, respectively. The first and second connection ports 8, 9 are connected with a cylindrical first connecting adapter 20A and a second connecting adapter 20B, assembling a suction valve 10 and a discharge valve 10', respectively.

The first and second connecting adapter 20A, 20B are connected with a first joint 25, which connects a flow path 26 of the transfer fluid on the suction side with the first connecting adapter 20A, and a second joint 25', which connects a flow path 27 of the transfer fluid on the discharge side, respectively. These first and second joints 25, 25' are also formed cylindrically. The suction valve 10 and the discharge valve 10' can be constituted of common valve cartridges 30 described below.

Thus, the flow path 26 on the suction side and the pump chamber 6 are connected with each other via the first joint 25, the first connecting adapter 20A, the suction valve 10, and the suction port 5a at the upper portion of the first connection port 8. The flow path 27 on the discharge side and the pump chamber 6 are connected with each other via the second joint 25', the second connecting adapter 20B, the discharge valve 10', and the discharge port 5b at the lower portion of the second connection port 9. The assembling direction and sequence of those parts are uniquely determined, and thereby any erroneous assembly of the metering pump 1 relative to the pump head 5 can be prevented.

As shown in FIG. 2, the first connection port 8 of the pump head 5 is provided with a screw part 8a, which opens downward and has a large diameter, and a fitting part 8b, which is provided above the screw part, has an inside diameter id1 smaller than that of the screw part 8a, communicates with the suction port 5a, and fits in the suction valve 10. The fitting part 8b fits with the upper portion of the suction valve 10 (i.e., an outflow end side of the transfer fluid). On the inner peripheral wall of the screw part 8a (hereinafter referred to as the "inner wall"), a female screw is formed, for example.

Moreover, as shown in FIG. 2 and FIG. 3, the second connection port 9 of the pump head 5 is provided with a screw part 9a, which opens upward and has a large diameter, and a fitting part 9b, which is provided below the screw part, has an inside diameter id2b smaller than that of the screw part 9a, communicates with the discharge port 5b, and fits with the discharge valve 10'. The fitting part 9b fits in the lower portion of the discharge valve 10' (i.e., an inflow end side of the transfer fluid). On the inner wall of the screw part 9a, a female screw is formed. On the inner side of the fitting part 9b are provided a plurality of ribs 9c, which protrude from the inner wall 9ba toward the center axis of the discharge port 5b, has the inscribed diameter id2t at a top of a top part 9ca smaller than the inside diameter id2b, and extends in the direction of connecting with the discharge valve 10'.

It is sufficient if there is at least one rib 9c. In the horizontal cross-section, for example, a rib forms a flat surface whose top part 9ca as a protruding end has a width of about 1 mm, for example, and has substantially a trapezoidal shape in which the angle of a leg from the inner wall 9ba as a lower base toward the top part 9ca as an upper base is about 90 degrees. In the first embodiment, ribs 9c are provided at equal spatial intervals in the circumferential direction, for example. The first and second connection ports 8, 9 of the pump head 5 have the abovementioned configurations.

On the other hand, the first connecting adapter 20A is disposed on the lower side of the suction valve 10, and as shown in FIG. 4 and FIG. 5, comprises a first male screw part 20a having a large diameter, a second male screw part 20c having a diameter smaller than thereof, and a middle body part 20b disposed therebetween. On an outer peripheral walls (hereinafter referred to as the "outer wall") of the first and second male screw parts 20a, 20c, male screws are formed.

The first male screw part 20a and the middle body part 20b open upward at the first connecting adapter 20A and constitute a third connection port 21, which houses the lower portion of the suction valve 10 internally. On an inner side of the third connection port 21 (i.e., the first male screw part 20a and the middle body part 20b), a concave fitting part 21b having an inside diameter id3b is provided. The lower portion of the suction valve 10 (i.e., the inflow end side of the transfer fluid) fits in the fitting part 21b. At the fitting part 21b are provided a plurality of ribs 21c having a top part 21ca protruding from an inner wall 21ba toward the center axis of a flow-through hole 28, wherein the plurality of ribs have a inscribed diameter id3t at the top part, which is smaller than the inside diameter id3b, and extend in the direction of connecting with the suction valve 10.

It is sufficient if there is at least one rib 21c. On the inner side of the second male screw part 20c, a suction-side connecting flow path 22 is formed that communicates with the flow-through hole 28, and on the open peripheral edge portion of the suction-side connecting flow path 22, O-ring 29 is mounted.

The second connecting adapter 20B is disposed on the upper side of the discharge valve 10', and as shown in FIG. 6, has an external appearance similar to that of the first connecting adapter 20A. The second connecting adapter 20B comprises a first male screw part 20a having a large diameter, which has male screws on the outer wall, a second male screw part 20c having a diameter smaller than thereof, and a middle body part 20b disposed therebetween. The first male screw part 20a and the middle body part 20b of the second connecting adapter 20B open downward at the second connecting adapter 20B and constitute a fourth connection port 23, which houses the upper portion of the discharge valve 10' internally. On an inner side of the fourth connection port 23 (i.e., the first male screw part 20a and the middle body part 20b), a concave fitting part 23b having an inside diameter id4 is provided. Thus, the upper portion of the discharge valve 10' (i.e., the outflow end side of the transfer fluid) fits in the fitting part 23b.

On the inner side of the second male screw part 20c of the second connecting adapter 20B, a discharge-side connecting flow path 24 is formed that communicates with the fitting part 23b via the flow-through hole 28, and on the open peripheral edge portion of the discharge-side connecting flow path 24, O-ring 29 is mounted. The first and second connecting adapters 20A, 20B have the abovementioned configurations.

As shown in FIG. 7, the suction valve 10 and the discharge valve 10' are constituted of cylindrical valve cartridges 30. The valve cartridge 30 contains a ball valve having a valve seat 33a (33b) and a valve ball 31a (31b), which is disposed above the valve seat 33a (33b) and blocks the valve seat by its own weight. On the periphery and upper side of the valve ball 31a (31b), excluding the valve seat 33a (33b), a valve guide 32a (32b) is provided. The valve cartridge 30 according to the present embodiment has two-staged ball valves in which the ball valves are disposed at upper and lower two stages.

The lower ball valve of the valve cartridge 30 is provided with a seat holder 40 mounted on an inflow end side of the transfer fluid, for example. In the present embodiment, the seat holder 40 constitutes a lower outer periphery of the valve cartridge 30 (i.e., an outer periphery on the inflow end side of the transfer fluid) and supports the valve seat 33b of the lower ball valve. For the valve ball 31a, 31b, materials, such as ceramics and metals, having a specific gravity larger than that of the transfer fluid may be used. The valve guide 32a, 32b may be formed of such materials as titanium and PVC. The valve seat 33a, 33b may be formed of rubber-based materials or the like.

At the transfer fluid outflow end of the valve cartridge 30 and the lower end as the inflow end of the seat holder 40, O-rings 29 are disposed, mounted on the open peripheral portions of valve flow paths 30a, 30b. The valve flow path 30a communicates with the suction port 5a when the valve cartridge 30 is used as the suction valve 10, and communicates with the flow-through hole 28 of the second connecting adapter 20B when the valve cartridge 30 is used as the discharge valve 10'.

The valve flow path 30b communicates with the flow-through hole 28 of the first connecting adapter 20A when the valve cartridge 30 is used as the suction valve 10, and communicates with the discharge port 5b, when the valve cartridge 30 is used as the discharge valve 10'. The valve cartridge 30 is provided with a plurality of slits 41, which are formed at an outer periphery of the seat holder 40 on the inflow end side of the transfer fluid (i.e., on the lower outer periphery of the valve cartridge 30), for example. The plurality of slits 41 extend in the direction of connecting with the second connection port 9 of the pump head 5 and the third connection port 21 of the first connecting adapter 20A, and to which the ribs 9c, 21c are loosely inserted. It is sufficient if at least one slit 41 is provided in such a manner that the ribs 9c, 21c can loosely be inserted. When no seat holder 40 is provided, the slit 41 is formed at the ball valve mounted on the inflow end side of the valve cartridge 30.

As shown in FIG. 8(a) through FIG. 8(c), slits 41 provided on the seat holder 40 are formed at the outer periphery of the seat holder 40, in such a manner that its outside diameter is od1t and the outside diameter of a bottom part 41a is od1b, and arranged at equal spatial intervals in the circumferential direction in alignment with the ribs 9c, 21c, for example.

Each slit 41 is provided with a slit side wall 41b and a taper side wall 41c in such a manner that the opening in the direction of connecting with the second connection port 9 of the pump head 5 and the third connection port 21 of the first connecting adapter 20A is widened. Since the slits 41 have such a shape, the ribs 9c, 21c can loosely be inserted into the slits 41 with ease at the time of connecting with the second connection port 9 and the third connection port 21. The valve cartridge 30 is formed in such a manner that the outside diameter of an upper outer periphery (i.e., an outer periphery on the outflow end side of the transfer fluid) is od2. The valve cartridge 30 constituting the suction valve 10 and the discharge valve 10' has the abovementioned configuration.

In the metering pump 1 having the abovementioned configuration, the dimensional relationship of various parts is as follows. First, the valve cartridge 30 is formed in such a manner that the outside diameter od1t of the lower outer periphery, which is the outer periphery of the seat holder 40, is larger than the outside diameter od2 of the upper outer periphery 30c. The valve cartridge is also formed in such a manner that the outside diameter od2 of the upper outer periphery 30c is larger than the outside diameter od1b of the bottom at the bottom part 41a of the slit 41 of the seat holder 40 (i.e., od1t>od2>od1b).

Next, the inside diameter id2b of the fitting part 9b at the second connection port 9 of the pump head 5 and the inside diameter id3b of the fitting part 21b at the third connection port 21 of the first connecting adapter 20A are formed in such a manner that they are each larger than the outside diameter od1t of the lower outer periphery of the valve cartridge 30 (i.e., (id2b, id3b)>od1t). Moreover, the inside diameter id1 of the fitting part 8b at the first connection port 8 of the pump head 5 and the inside diameter id4 of the fitting part 23b at the fourth connection port 23 of the second connecting adapter 20B are formed in such a manner that they are each smaller than the outside diameter od1t of the lower outer periphery of the valve cartridge 30 (i.e., od1t>(id1, id4)). Accordingly, the dimensional relationship among the inside diameters id2b, id3b of the fitting parts 9b, 21b of the second and third connection ports 9, 21, the outside diameter od1t of the lower outer periphery of the valve cartridge 30, and the inside diameters id1, id4 of the fitting parts 8b, 23b of the first and fourth connection ports 8, 23 is as follows: (id2b, id3b)>od1t>(id1, id4).

Moreover, the inside diameter id1 of the fitting part 8b at the first connection port 8 of the pump head 5 and the inside diameter id4 of the fitting part 23b at the fourth connection port 23 of the second connecting adapter 20B are formed in such a manner that they are each larger than the outside diameter od2 of the upper outer periphery 30c of the valve cartridge 30 (i.e., (id1, id4)>od2). Moreover, the inscribed diameter id2t of the top at the top part 9ca of the rib 9c at the fitting part 9b of the second connection port 9 of the pump head 5 and the inscribed diameter id3t of the top at the top part 21ca of the rib 21c at the fitting part 21b of the third connection port 21 of the first connecting adapter 20A are formed in such a manner that they are each smaller than the outside diameter od2 of the upper outer periphery 30c of the valve cartridge 30 (i.e., od2>(id2t, id3t)). Accordingly, the dimensional relationship among the inside diameters id1, id4 of the fitting parts 8b, 23b of the first and fourth connection ports 8, 23, the outside diameter od2 of the upper outer periphery 30c of the valve cartridge 30, and the inscribed diameters id2t, id3t of the top at the top part 9ca, 21ca of the ribs 9c, 21c at the fitting parts 9b, 21b of the second and third connection ports 9, 21 is as follows: (id1, id4)>od2>(id2t, id3t).

Moreover, the inscribed diameter id2t of the top at the top part 9ca of the rib 9c at the fitting part 9b of the second connection port 9 of the pump head 5 and the inscribed diameter id3t of the top at the top part 21ca of the rib 21c at the fitting part 21b of the third connection port 21 of the first connecting adapter 20A are formed in such a manner that they are each larger than the outside diameter od1b of the bottom at the bottom part 41a of the slit 41 of the seat holder 40, which constitutes the lower outer periphery of the valve cartridge 30 (i.e., (id2t, id3t)>od1b).

Accordingly, at the first connection port 8, the second connection port 9, the suction valve 10, the discharge valve 10', the first connecting adapter 20A, the second connecting adapter 20B, the ribs 9c, 21c, and the slits 41, the following relationship is satisfied: (inside diameter id2b, inside diameter id3b)>outside diameter od1t>(inside diameter id1, inside diameter id4)>outside diameter od2>(inscribed diameter of the top id2t, inscribed diameter of the top id3t) >outside diameter of the bottom od1b. As shown in FIG. 1, such a structure make it possible to uniquely determine the assembling direction and sequence of the first connecting adapter 20A, the suction valve 10 and the first connection port 8 as well as the assembling direction and sequence of the second connecting adapter 20B, the discharge valve 10' and the second connection port 9, relative to the pump head 5 of the metering pump 1.

The metering pump 1 can easily be assembled without making any erroneous assembling of parts, in condition where the normal route of the transfer fluid has been decided from the suction side flow path 26 to the discharge side flow path 27 via the pump head 5, if the first joint 25 is connected with the second male screw part 20c of the first connecting adapter 20A and the second joint 25' to the second male screw part 20c of the second connecting adapter 20B in advance before assembling the metering pump 1.

Furthermore, as the suction valve 10 and the discharge valve 10' can be constituted of the valve cartridge 30, common parts can be used, so that the cost can be reduced. Hence, the reciprocating pump according to the first embodiment of the present invention enables to realize a structure in which no erroneous assembling of valves occurs, while lowering the cost of parts. Therefore, any defective transfer of the transfer fluid can be prevented from occurring, so that safety can be enhanced.

Figure 9:
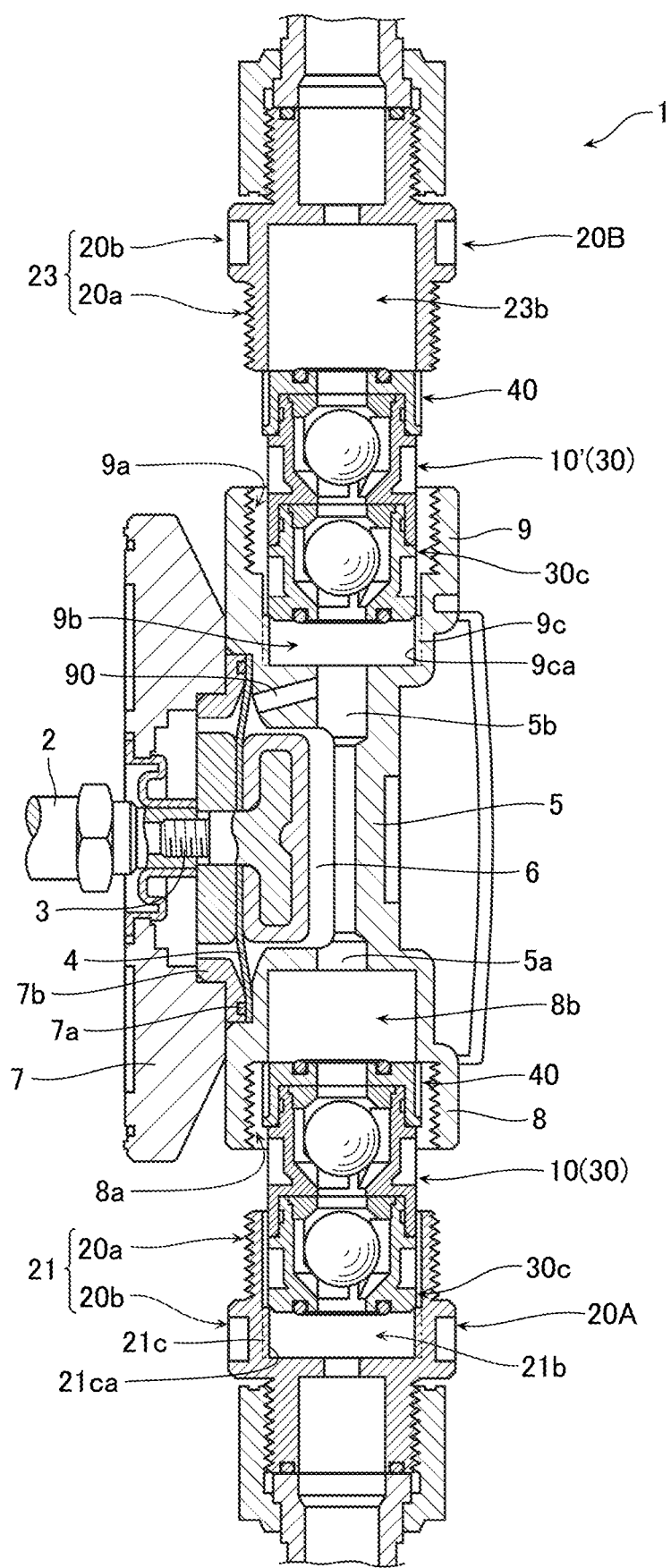
FIG. 9 is a sectional view showing an example of erroneously assembling the same reciprocating pump.
Figure 10:
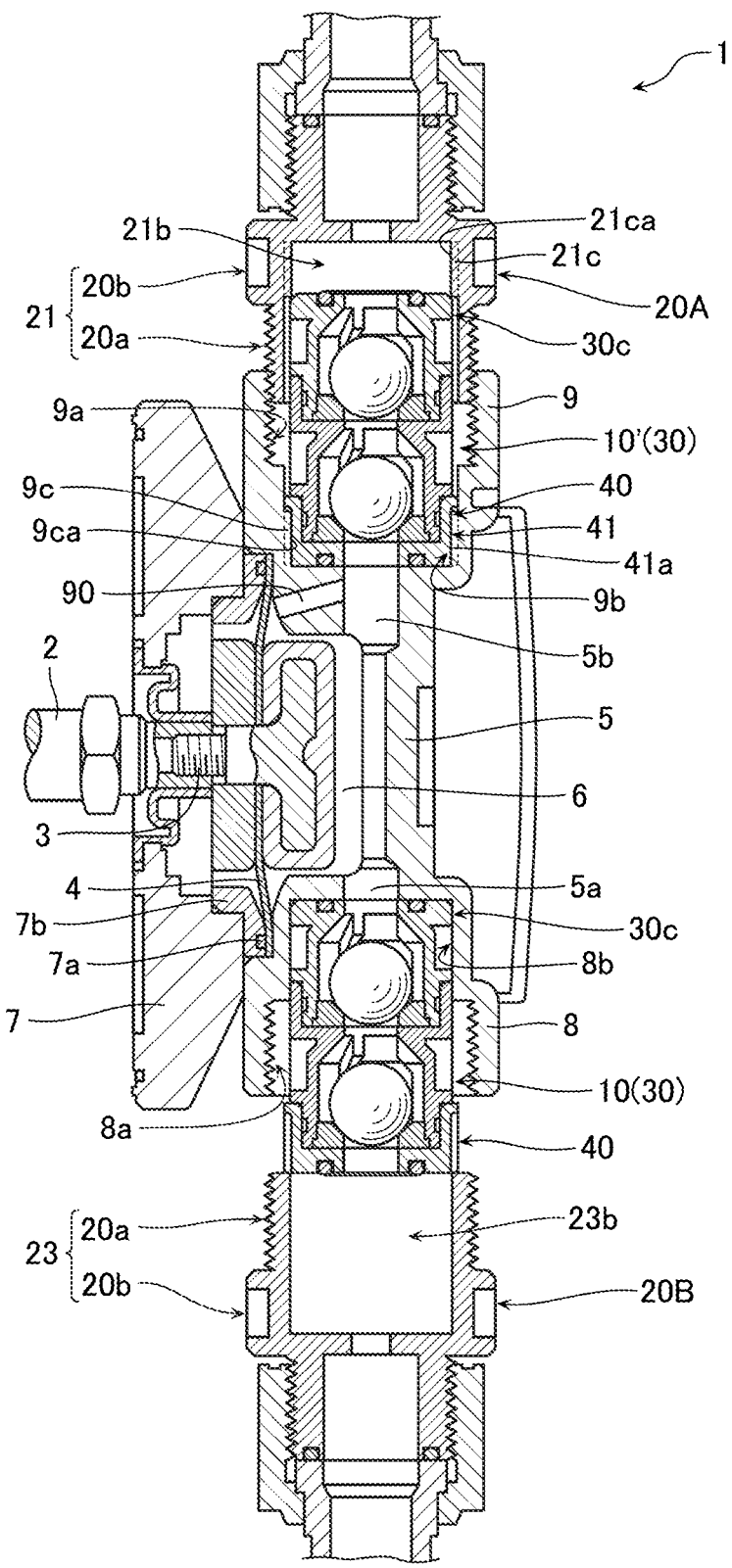
FIG. 10 is a sectional view showing an example of erroneously assembling the same reciprocating pump.
Figure 11:
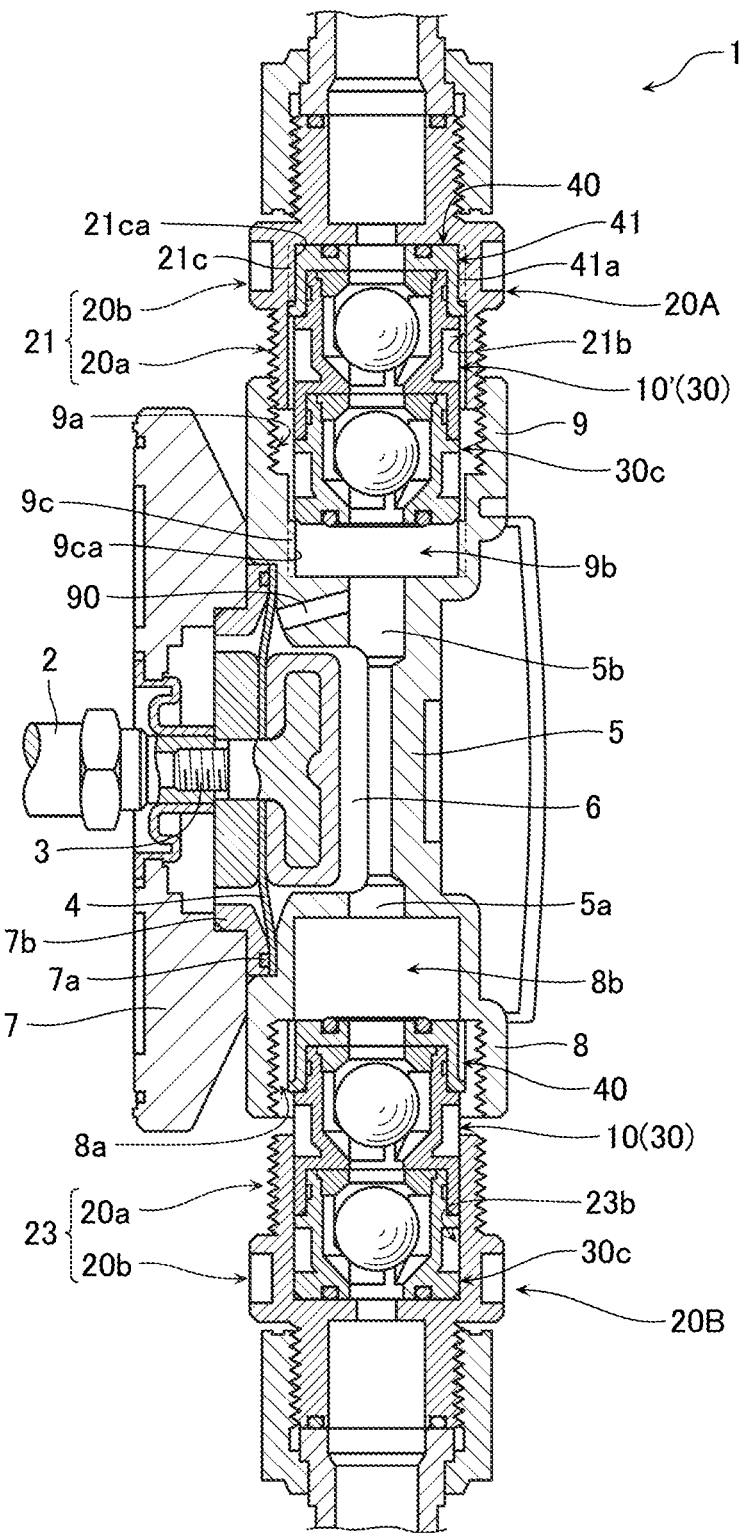
FIG. 11 is a sectional view showing an example of erroneously assembling the same reciprocating pump.

Next, the following describes cases in which some parts are erroneously assembled in the pump head 5 of the metering pump 1 according to the present embodiment. FIG. 9 through FIG. 11 shows sectional views showing examples of assembling the metering pump 1 erroneously. First, the following explains an erroneous assembling case in FIG. 9. In FIG. 9, the assembling directions of the suction valve 10 and the discharge valve 10' are each reversed in general outline.

As shown in FIG. 9, first on the suction side of the pump head 5, the suction valve 10 (the valve cartridge 30; the same shall apply hereinafter) is about to be assembled, in condition where the upside and downside thereof is reversed relative to the first connection port 8 and the first connecting adapter 20A. In this case, the suction valve 10 cannot be inserted into the fitting part 8b, because the outside diameter od1t at the outer periphery of the seat holder 40 of the suction valve 10 is larger than the inside diameter id1 of the fitting part 8b of the first connection port 8.

Moreover, as the outside diameter od2 of the upper outer periphery 30c of the suction valve 10 is larger than the inscribed diameter id3t of the top at the top part 21ca of the rib 21c at the fitting part 21b of the third connection port 21 of the first connecting adapter 20A, and therefore the suction valve 10 cannot completely fits in the fitting part 21b by having the outflow end side of the suction valve 10 coming into contact with the rib 21c. Accordingly, the first male screw part 20a of the first connecting adapter 20A cannot be screwed into the screw part 8a of the first connection port 8, and thus the suction side of the pump head 5 cannot be assembled.

On the other hand, on the discharge side of the pump head 5, the discharge valve 10' (the valve cartridge 30; the same shall apply hereinafter) is about to be assembled, in condition where the upside and downside thereof is reversed relative to the second connection port 9 and the second connecting adapter 20B. In this case, the discharge valve 10' cannot be inserted into the fitting part 23b, because the outside diameter od1t at the outer periphery of the seat holder 40 of the discharge valve 10' is larger than the inside diameter id4 of the fitting part 23b at the fourth connection port 23 of the second connecting adapter 20B.

Moreover, because the outside diameter od2 of the upper outer periphery 30c of the discharge valve 10' is larger than the inscribed diameter id2t of the top at the top part 9ca of the rib 9c at the fitting part 9b of the second connection port 9, the discharge valve 10' cannot completely fits in the fitting part 9b by having the outflow end side of the discharge valve 10' coming into contact with the rib 9c. Accordingly, the first male screw part 20a of the second connecting adapter 20B cannot be screwed into the screw part 9a of the second connection port 9, and thus the discharge side of the pump head 5 cannot be assembled, either. Thus, the metering pump 1 cannot be assembled when the assembling directions of the suction valve 10 and the discharge valve 10' are each reversed.

Next, the following explains an erroneous assembling case shown in FIG. 10. In FIG. 10, the assembling directions and sequences of the first and second connecting adapters 20A, 20B are each reversed in general outline. As shown in FIG. 10, first on the suction side of the pump head 5, the second connecting adapter 20B is about to be assembled into the suction valve 10 and the first connection port 8, in condition where the opening of the fourth connection port 23 is oriented upward. In this case, the suction valve 10 completely fits in the fitting part 8b, because the outside diameter od2 of the upper outer periphery 30c of the suction valve 10 is smaller than the inside diameter id1 of the fitting part 8b of the first connection port 8.

On the other hand, the suction valve 10 cannot be inserted into the fitting part 23b, because the outside diameter od1t at the outer periphery of the seat holder 40 of the suction valve 10 is larger than the inside diameter id4 of the fitting part 23b at the fourth connection port 23 of the second connecting adapter 20B. Accordingly, the first male screw part 20a of the second connecting adapter 20B cannot screw in the screw part 8a of the first connection port 8, and thus the suction side of the pump head 5 cannot be assembled.

Moreover, on the discharge side of the pump head 5, the first connecting adapter 20A is about to be assembled into the discharge valve 10' and the second connection port 9, in condition where the opening of the third connection port 21 is oriented downward. In this case, the outside diameter od1t at the outer periphery of the seat holder 40 of the discharge valve 10' is smaller than the inside diameter id2b of the fitting part 9b of the second connection port 9, and the outside diameter od1b of the bottom at the bottom part 41a of the slit 41 is smaller than the inscribed diameter id2t of the top at the top part 9ca of the rib 9c, and therefore the discharge valve 10' completely fits in the fitting part 9b.

However, because the outside diameter od2 of the upper outer periphery 30c of the discharge valve 10' is larger than the inscribed diameter id3t of the top at the top part 21ca of the rib 21c, though it is smaller than the inside diameter id3b of the fitting part 21b of the first connecting adapter 20A, the discharge valve 10' cannot completely fit in the fitting part 21b by having the outflow end side of the discharge valve 10' coming into contact with the rib 21c.

However, the first male screw part 20a of the first connecting adapter 20A can partly be screwed into the screw part 9a of the second connection port 9, and therefore the discharge side of the pump head 5 can be assembled in a halfway state. Nevertheless, even in this case, the suction side of the pump head 5 cannot be assembled, as described above, and therefore the metering pump 1 cannot be assembled when the assembling directions and sequences of the first and second connecting adapters 20A, 20B are each reversed.

Next, the following explains an erroneous assembling case shown in FIG. 11. In FIG. 11, all of the assembling directions of the suction valve 10 and the discharge valve 10' as well as all of the assembling directions and sequences of the first and second connecting adapters 20A, 20B are reversed in general outline. As shown in FIG. 11, first on the suction side of the pump head 5, the upside and downside of the suction valve 10 are reversed relative to the first connection port 8, and the second connecting adapter 20B is about to be assembled, in condition where the opening of the fourth connection port 23 is oriented upward. In this case, the suction valve 10 cannot be inserted into the fitting part 8b, because the outside diameter od1t at the outer periphery of the seat holder 40 of the suction valve 10 is larger than the inside diameter id1 of the fitting part 8b of the first connection port 8.

On the other hand, although the suction valve 10 can completely fit in the fitting part 23b, because the outside diameter od2 of the upper outer periphery 30c of the suction valve 10 is smaller than the inside diameter id4 of the fitting part 23b at the fourth connection port 23 of the second connecting adapter 20B, the first male screw part 20a of the second connecting adapter 20B cannot be screwed into the screw part 8a of the first connection port 8. Accordingly, the suction side of the pump head 5 cannot be assembled.

Moreover, on the discharge side of the pump head 5, the upside and downside of the discharge valve 10' are reversed relative to the second connection port 9, and the first connecting adapter 20A is about to be assembled, in condition where the opening of the third connection port 21 is oriented downward. In this case, because the outside diameter od2 of the upper outer periphery 30c of the discharge valve 10' is larger than the inscribed diameter id2t of the top at the top part 9ca of the rib 9c, though it is smaller than the inside diameter id2b of the fitting part 9b of the second connection port 9, the discharge valve 10' cannot completely fit in the fitting part 9b by having the outflow end side of the discharge valve 10' coming into contact with the rib 9c.

On the other hand, the outside diameter od1t of the seat holder 40 of the discharge valve 10' is smaller than the inside diameter id3b of the fitting part 21b at the third connection port 21 of the first connecting adapter 20A, and the outside diameter od1b of the bottom at the bottom part 41a of the slit 41 is smaller than the inscribed diameter id3t of the top at the top part 21ca of the rib 21c, and therefore the discharge valve 10' can completely fit in the fitting part 21b. Accordingly, the first male screw part 20a of the first connecting adapter 20A can partly be screwed into the screw part 9a of the second connection port 9, so that the discharge side of the pump head 5 can be assembled in a halfway state.

Nevertheless, even in this case, the suction side of the pump head 5 cannot be assembled, as described above, and therefore the metering pump 1 cannot be assembled when the assembling directions of the suction valve 10 and the discharge valve 10' as well as the assembling directions and sequences of the first and second connecting adapters 20A, 20B are reversed.

Thus, according to the metering pump 1 provided with the preventive structure for erroneous valve assembly of the first embodiment, the assembling directions and sequences of the first connecting adapter 20A, the second connecting adapter 20B, the valve cartridge 30, the first connection port 8, and the second connection port 9 are uniquely determined, and therefore the metering pump 1 cannot be assembled if the assembling direction and sequence of any one of them is wrong. Accordingly, any defective transfer caused by erroneous assembling can be prevented from occurring, so that safety can be enhanced. Moreover, since both the suction valve 10 and the discharge valve 10' can be constituted by using the same valve cartridge 30, the cost of parts can be reduced.

Figure 12:
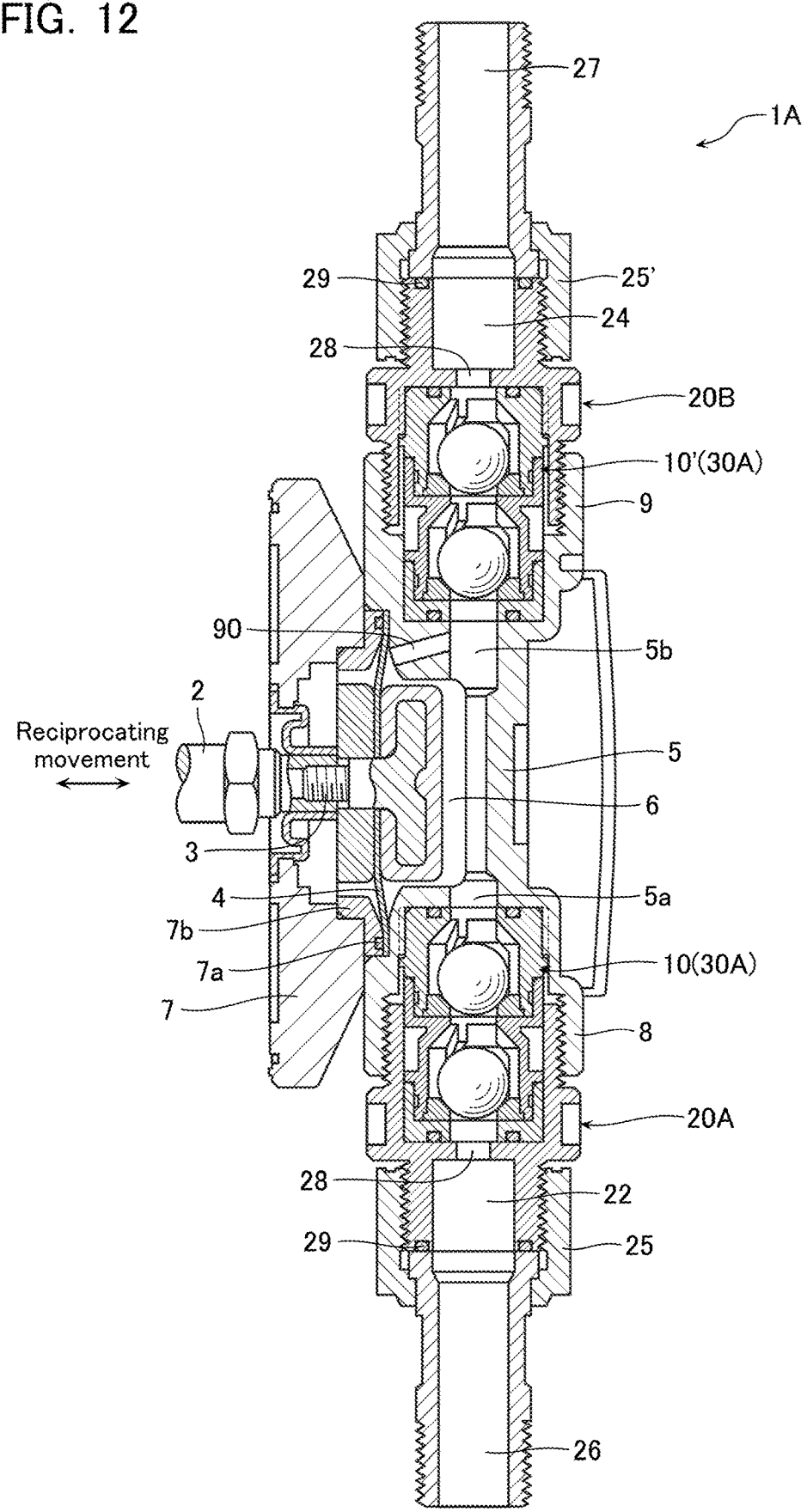
FIG. 12 is a sectional view showing the main part of a reciprocating pump according to a second embodiment of the present invention.
Figure 13:
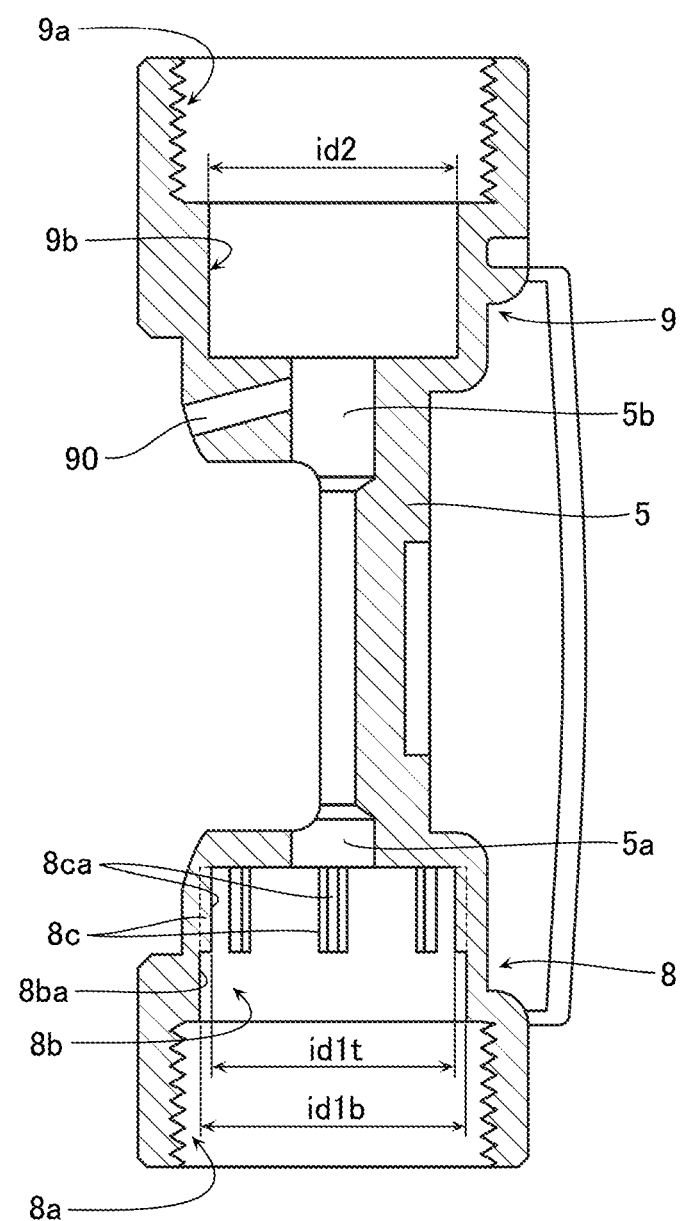
FIG. 13 is a sectional view showing the main part of the pump head of the same reciprocating pump.
Figure 14:
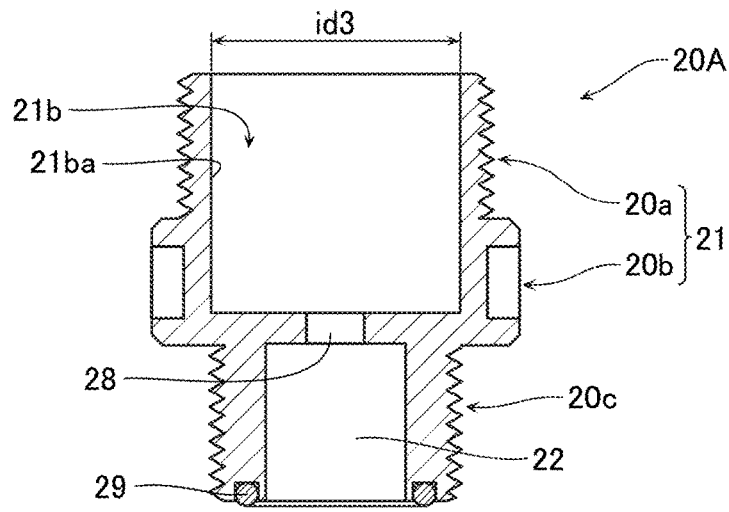
FIG. 14 is a sectional view showing a first connecting adapter of the same reciprocating pump.
Figure 15:
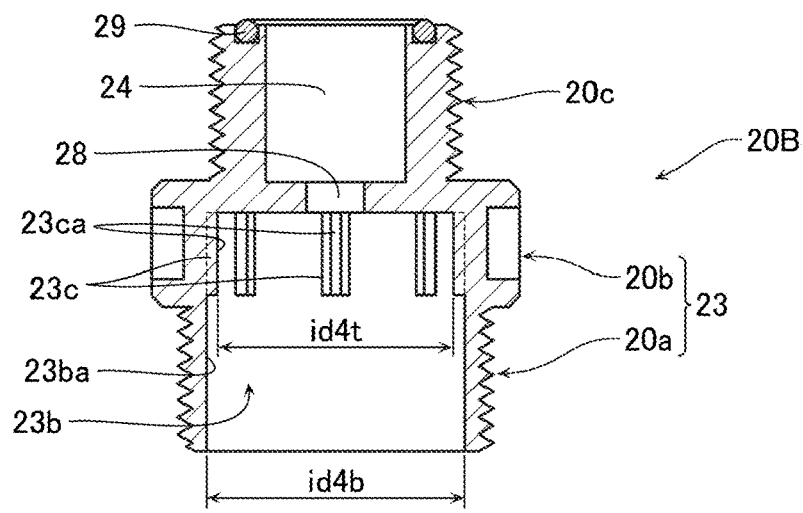
FIG. 15 is a sectional view showing a second connecting adapter of the same reciprocating pump.
Figure 16:
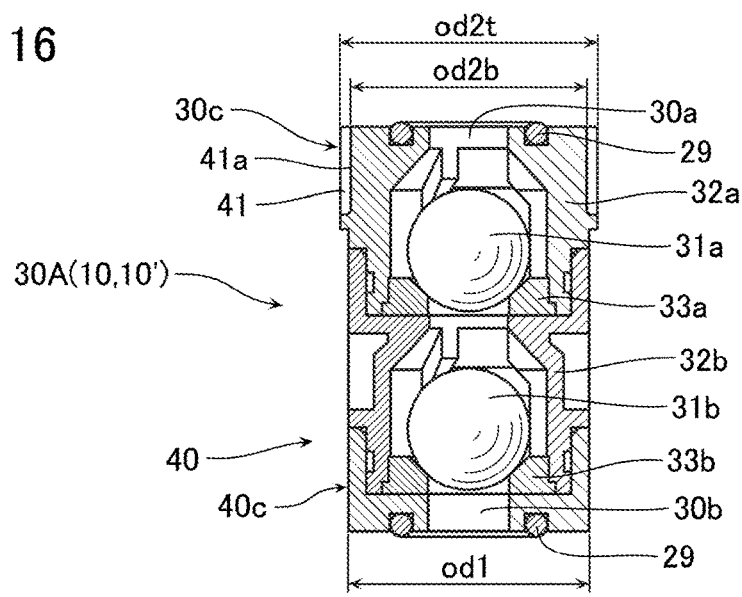
FIG. 16 is a sectional view showing a valve cartridge constituting suction and discharge valves of the same reciprocating pump.

FIG. 12 is a sectional view showing the main part of a reciprocating pump according to a second embodiment of the present invention. FIG. 13 is a sectional view showing the main part of the pump head 5 of the same reciprocating pump. FIG. 14 is a sectional view showing a first connecting adapter of the same reciprocating pump. FIG. 15 is a sectional view showing a second connecting adapter of the same reciprocating pump. FIG. 16 is a sectional view showing a valve cartridge 30A constituting a suction valve 10 and a discharge valve 10' of the same reciprocating pump. In the description of FIG. 12 and thereafter, the same reference numbers are used for the same components as used in the first embodiment and, therefore, any redundant explanation is omitted below.

As shown in FIG. 12, a metering pump 1A according to a second embodiment of the present invention comprises a pump head 5 having first and second connection ports 8, 9, a suction valve 10, a discharge valve 10', and first and second connecting adapters 20A, 20B, just as the metering pump 1 according to the first embodiment.

However, the metering pump 1A according to the second embodiment is different from the metering pump 1 according to the first embodiment in that the structure of the first and second connection ports 8, 9, the structure of a valve cartridge 30A constituting the suction valve 10 and the discharge valve 10', and the structure of first and second connecting adapters 20A, 20B are vertically reversed from the structure of the metering pump 1 according to the first embodiment.

More specifically, as shown in FIG. 13, the first connection port 8 of the pump head 5 is constituted of a screw part 8a, which is open downward and has a large diameter, and a fitting part 8b, which is provided above the screw part 8a, has an inside diameter id1b smaller than the diameter of the screw part 8a, communicates with a suction port 5a and fits with the suction valve 10. The upper portion of the suction valve 10 is to be fitted in the fitting part 8b. On the inner wall of the screw part 8a, a female screw is formed. On the inner side of the fitting part 8b is provided at least one (multiple in the present embodiment) rib 8c, which protrudes toward the center axis of the suction port 5a from the inner wall 8ba, has the inscribed diameter id1t of the top at the top part 8ca smaller than the inside diameter id1b and extends in the direction of connecting with the suction valve 10.

On the other hand, the second connection port 9 of the pump head 5 is constituted of a screw part 9a, which is open upward and has a large diameter, and a fitting part 9b, which is provided below the screw part 9a, has an inside diameter id2 smaller than the diameter of the screw part, communicates with a discharge port 5b and fits with the discharge valve 10'. The lower portion of the discharge valve 10' is to be fitted in the fitting part 9b. The first and second connection ports 8, 9 of the pump head 5 of the metering pump 1A have the abovementioned structure.

As shown in FIG. 14, the first connecting adapter 20A is disposed on the lower side of the suction valve 10 and comprises a first male screw part 20a having a large diameter and a second male screw part 20c having a diameter smaller than that of the first male screw part and a middle body part 20b disposed therebetween, and male screws are formed on the outer walls of the first and second male screw parts 20a, 20c. On the inner side of a third connection port 21, which is constituted of the first male screw part 20a and the middle body part 20b and is open upward, a fitting part 21b is provided that has the inside diameter id3 and fits in the lower portion of the suction valve 10.

As shown in FIG. 15, the second connecting adapter 20B is disposed on the upper side of the discharge valve 10' and is constituted of first and second male screw parts 20a, 20c and a middle body part 20b, just as the first connecting adapter 20A, and on the inner side of a fourth connection port 23, which is constituted of the first male screw part 20a and the middle body part 20b and is open downward, a fitting part 23b is provided that has the inside diameter id4b and fits in the upper portion of the discharge valve 10'. The fitting part 23b is provided with at least one (multiple in the present embodiment) rib 23c, which has its top part 23ca protruded toward the center axis of a flow-through hole 28 from an inner wall 23ba, has the inscribed diameter id4t of the top smaller than the inside diameter id4b and extends in the direction of connecting with the discharge valve 10'. The first and second adapters 20A, 20B of the metering pump 1A has the abovementioned configurations.

As shown in FIG. 16, the suction valve 10 and the discharge valve 10' are constituted of the valve cartridge 30A. The valve cartridge 30A comprises two-staged ball valves in which ball valves are disposed at upper and lower two stages and which have valve seats 33a (33b) and valve balls 31a (31b).

The lower ball valve of the valve cartridge 30A is provided with a seat holder 40, which constitutes the lower outer periphery of the valve cartridge 30A and supports the valve seat 33b of the lower ball valve. The valve cartridge 30A is provided with at least one (multiple in the present embodiment) slit 41, which is formed at the outer periphery 30c of the ball valve on the outflow end side of the transfer fluid (i.e., the upper outer periphery of the valve cartridge 30A) and extends in the direction of connecting with the first connection port 8 of the pump head 5 and the fourth connection port 23 of the second connecting adapter 20B and into which the ribs 8c, 23c are to be loosely inserted.

Each slit 41 provided at the upper outer periphery 30c of the valve cartridge 30A is formed in such a manner that its outside diameter is od2t and the outside diameter of the bottom at the bottom part 41a is od2b and is provided in such a manner as to be in alignment with the arrangement of the rib 8c, 23c. Moreover, the valve cartridge 30A is formed in such a manner that the outside diameter of the outer periphery 40c of the seat holder 40, which constitutes the outer periphery on the inflow end side of the transfer fluid (i.e., the lower outer periphery of the valve cartridge 30A), is od1. The valve cartridge 30A constituting the suction valve 10 and the discharge valve 10' has the abovementioned configuration.

In the metering pump 1A having the abovementioned configuration, the dimensional relationship of various parts is as follows. First, the valve cartridge 30A is formed in such a manner that the outside diameter od2t of the upper outer periphery 30c is larger than the outside diameter od1 of the lower outer periphery, which is the outer periphery 40c of the seat holder 40. The outside diameter od1 of the lower outer periphery is formed in such a manner as to be larger than the outside diameter od2b of the bottom at the bottom part 41a of the slit 41 of the upper outer periphery 30c (i.e., od2t>od1>od2b).

Next, each of the inside diameter id1b of the fitting part 8b at the first connection port 8 of the pump head 5 and the inside diameter id4b of the fitting part 23b at the fourth connection port 23 of the second connecting adapter 20B is formed in such a manner as to be larger than the outside diameter od2t of the upper outer periphery 30c of the valve cartridge 30A (i.e., (id1b, id4b)>od2t). Moreover, each of the inside diameter id2 of the fitting part 9b at the second connection port 9 of the pump head 5 and the inside diameter id3 of the fitting part 21b at the third connection port 21 of the first connecting adapter 20A is formed in such a manner as to be smaller than the outside diameter od2t of the upper outer periphery 30c of the valve cartridge 30A (i.e., od2t>(id2, id3)). Accordingly, the dimensional relationship among the inside diameters id1b, id4b of the fitting parts 8b, 23b of the first and fourth connection ports 8, 23, the outside diameter od2t of the upper outer periphery 30c of the valve cartridge 30A, and the inside diameters id2, id3 of the fitting parts 9b, 21b of the second and third connection ports 9, 21 is as follows: (id1b, id4b)>od2t>(id2, id3).

Moreover, the inside diameter id2 of the fitting part 9b at the second connection port 9 of the pump head 5 and the inside diameter id3 of the fitting part 21b at the third connection port 21 of the first connecting adapter 20A are formed in such a manner as to be larger than the outside diameter od1 of the lower outer periphery of the valve cartridge 30A (i.e., the outer periphery 40c of the seat holder 40) (i.e., (id2, id3)>od1). Moreover, the inscribed diameter id1t of the top at the top part 8ca of the rib 8c at the fitting part 8b of the first connection port 8 of the pump head 5 and the inscribed diameter id4t of the top at the top part 23ca of the rib 23c at the fitting part 23b of the fourth connection port 23 of the second connecting adapter 20B are formed in such a manner as to be smaller than the outside diameter od1 of the lower outer periphery of the valve cartridge 30 (i.e., the outer periphery 40c of the seat holder 40) (i.e., od1>(id1t, id4t)). Accordingly, the dimensional relationship among the inside diameters id2, id3 of the fitting parts 9b, 21b of the second and third connection ports 9, 21, the outside diameter od1 of the lower outer periphery of the valve cartridge 30A (the outer periphery 40c of the seat holder 40), and the inscribed diameters id1t, id4t of the top at the top part 8ca, 23ca of the ribs 8c, 23c at the fitting parts 8b, 23b of the first and fourth connection ports 8, 23 is as follows: (id2, id3)>od1>(id1t, id4t).

Moreover, each of the inscribed diameter id1t of the top at the top part 8ca of the rib 8c at the fitting part 8b of the first connection port 8 of the pump head 5 and the inscribed diameter id4t of the top at the top part 23ca of the rib 23c at the fitting part 23b of the fourth connection port 23 of the second connecting adapter 20B is formed in such a manner as to be larger than the outside diameter od2b of the bottom at the bottom part 41a of the slit 41 at the upper outer periphery 30c of the valve cartridge 30A (i.e., (id1t, id4t)>od2b).

Accordingly, the following relationship is satisfied at the first connection port 8, the second connection port 9, the suction valve 10, the discharge valve 10', the first connecting adapter 20A, the second connecting adapter 20B, the ribs 8c, 23c and the slits 41: (inside diameter id1b, inside diameter id4b)>outside diameter od2t>(inside diameter id2, inside diameter id3)>outside diameter od1>(inscribed diameter of the top id1t, inscribed diameter of the top id4t)>outside diameter of the bottom od2b. As shown in FIG. 12, such a configuration makes it possible to uniquely determine the assembling direction and sequence of the first connecting adapter 20A, the suction valve 10 and the first connection port 8 as well as the assembling direction and sequence of the second connecting adapter 20B, the discharge valve 10' and the second connection port 9, relative to the pump head 5 of the metering pump 1A.

Thus, the metering pump 1A can easily be assembled without making any erroneous assembling of parts, in condition where the normal route of the transfer fluid has been decided from the suction side flow path 26 to the discharge side flow path 27 via the pump head 5, before assembling the metering pump 1A. Furthermore, as the suction valve 10 and the discharge valve 10' can be constituted of the valve cartridge 30A, common parts can be used, so that the cost can be reduced. Hence, the reciprocating pump according to the second embodiment of the present invention enables to achieve the working effect similar to that of the metering pump 1 according to the first embodiment. The explanation of the erroneous assembling of parts relative to the pump head 5 of the metering pump 1A is omitted here, because such erroneous assembling can easily be appreciated in a manner similar to that described in FIGS. 9-11.

DESCRIPTION OF THE REFERENCE NUMBERS 1, 1A Metering pump
5 Pump head
8 First connection port
8a Screw part
8b Fitting part
8c Rib
9 Second connection port
9a Screw part
9b Fitting part
9ba Inner wall
9c Rib
9ca Top part
10 Suction valve (valve cartridge 30, 30A)
10' Discharge valve (valve cartridge 30, 30A)
20A First connecting adapter
20B Second connecting adapter
20a First male screw part
20b Middle body part
20c Second male screw part
21 Third connection port
21b Fitting part
21c Rib
21ca Top part
23 Fourth connection port
23b Fitting part
23c Rib
30, 30A Valve cartridge
30c Upper outer periphery
40 Seat holder
41 Slit

The invention claimed is:

1. A reciprocating pump, which introduces a transfer fluid to a pump chamber via a suction valve and discharges the transfer fluid from the pump chamber via a discharge valve by reciprocating movement of a reciprocating movement member facing the pump chamber, the reciprocating pump comprising:

a pump head having the pump chamber; a first connection port provided on a transfer fluid suction side of the pump chamber; and a second connection port provided on a transfer fluid discharge side of the same, the first and second connection ports communicating with the pump chamber;

the suction valve comprising a valve cartridge, the valve cartridge containing a ball valve having a valve seat and a valve ball, wherein the valve ball is disposed above the valve seat and closes the valve seat by its own weight, an upper portion of the suction valve being housed in the first connection port;

the discharge valve comprising the valve cartridge, a lower portion of the discharge valve being housed in the second connection port;

a first connecting adapter, which is disposed on a lower side of the suction valve, has a third connection port housing a lower portion of the suction valve internally and connects the suction valve with the first connection port; and a second connecting adapter, which is disposed on an upper side of the discharge valve, has a fourth connection port housing an upper portion of the discharge valve internally and connects the discharge valve with the second connection port, wherein at least one rib extending in a connecting direction of the valve cartridge is provided on each of inner sides of the second connection port of the pump head and the third connection port of the first connecting adapter;

at a lower outer periphery of the valve cartridge, at least one slit which extends in the connecting direction and into which the rib is loosely inserted is provided, and relationship (id2b, id3b)>od1t>(id1, id4)>od2>(id2t, id3t)>od1b is satisfied, wherein an inside diameter of the first connection port is id1, an inside diameter of the second connection port is id2b, an inscribed diameter at a top of the rib of the second connection port is id2t, an inside diameter of the third connection port is id3b, an inscribed diameter at a top of the rib of the third connection port is id3t, an inside diameter of the fourth connection port is id4, an outside diameter of the lower outer periphery of the valve cartridge is od1t, an outside diameter of a bottom of the slit at the lower outer periphery is od1b, and an outside diameter of the upper outer periphery of the valve cartridge is od2.

2. The reciprocating pump according to claim 1, wherein a plurality of the at least one rib and a plurality of the at least one slit are provided at equal spatial intervals in a peripheral direction.

3. The reciprocating pump according to claim 1, wherein the valve cartridge has two-staged ball valves in which the ball valves are disposed at upper and lower two stages, and the slit is formed at the ball valve mounted on the inflow end side of the valve cartridge or the ball valve mounted on the outflow end side of the same.

4. The reciprocating pump according to claim 1, wherein the slit is formed in such a manner that an opening facing the connecting direction is widened.

5. A reciprocating pump, which introduces a transfer fluid to a pump chamber via a suction valve and discharges the transfer fluid from the pump chamber via a discharge valve by means of the reciprocating movement of a reciprocating movement member facing the pump chamber, the reciprocating pump comprising:

a pump head having the pump chamber; a first connection port provided on a transfer fluid suction side of the pump chamber; and a second connection port provided on a transfer fluid discharge side of the same, the first and second connection ports communicating with the pump chamber;

the suction valve comprising a valve cartridge, the valve cartridge containing a ball valve having a valve seat and a valve ball, wherein the valve ball is disposed above the valve seat and closes the valve seat by its own weight, an upper portion of the suction valve being housed in the first connection port;

the discharge valve comprising the valve cartridge, a lower portion of the discharge valve being housed in the second connection port;

a first connecting adapter, which is disposed on a lower side of the suction valve, has a third connection port housing a lower portion of the suction valve internally and connects the suction valve with the first connection port; and a second connecting adapter, which is disposed on an upper side of the discharge valve, has a fourth connection port housing an upper portion of the discharge valve internally and connects the discharge valve with the second connection port, wherein at least one rib extending in a connecting direction of the valve cartridge is provided on each of inner sides of the first connection port of the pump head and the fourth connection port of the second connecting adapter;

at an upper outer periphery of the valve cartridge, at least one slit which extends in the connecting direction and into which the rib is loosely inserted is provided, and relationship (id1b, id4b)>od2t>(id2, id3)>od1>(id1t, id4t)>od2b is satisfied, wherein an inside diameter of the first connection port is id1b, an inscribed diameter at a top of the rib of the first connection port is id1t, an inside diameter of the second connection port is id2, an inside diameter of the third connection port is id3, an inside diameter of the fourth connection port is id4b, an inscribed diameter at a top of the rib of the fourth connection port is id4t, an outside diameter of the upper outer periphery of the valve cartridge is od2t, an outside diameter of a bottom of the slit at the upper outer periphery is od2b, and an outside diameter of the lower outer periphery of the valve cartridge is od1.

6. The reciprocating pump according to claim 5, wherein a plurality of the at least one rib and a plurality of the at least one slit are provided at equal spatial intervals in a peripheral direction.

7. The reciprocating pump according to claim 5, wherein the valve cartridge has two-staged ball valves in which the ball valves are disposed at upper and lower two stages, and the slit is formed at the ball valve mounted on the inflow end side of the valve cartridge or the ball valve mounted on the outflow end side of the same.

8. The reciprocating pump according to claim 5, wherein the slit is formed in such a manner that an opening facing the connecting direction is widened.

* * * * *